United States Patent
Bhalla

(10) Patent No.: US 10,193,851 B2
(45) Date of Patent: Jan. 29, 2019

(54) TECHNIQUES FOR MAPPING MACHINE TO MACHINE COMMUNICATION TO DIFFERENT UNDERLYING NETWORKS

(71) Applicant: ZTE Corporation, Shenzhen (CN)

(72) Inventor: Rajesh Bhalla, Gahanna, OH (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/118,082

(22) PCT Filed: Feb. 10, 2015

(86) PCT No.: PCT/US2015/015287
§ 371 (c)(1),
(2) Date: Aug. 10, 2016

(87) PCT Pub. No.: WO2015/120484
PCT Pub. Date: Aug. 13, 2015

(65) Prior Publication Data
US 2016/0359797 A1 Dec. 8, 2016

Related U.S. Application Data

(60) Provisional application No. 61/938,127, filed on Feb. 10, 2014.

(51) Int. Cl.
*H04L 29/12* (2006.01)
*H04L 29/08* (2006.01)
(Continued)

(52) U.S. Cl.
CPC .......... *H04L 61/106* (2013.01); *H04L 67/306* (2013.01); *H04W 4/70* (2018.02); *H04W 60/04* (2013.01)

(58) Field of Classification Search
CPC ....... H04W 4/005; H04W 60/04; H04W 8/26; H04W 76/021; H04W 76/045;
(Continued)

(56) References Cited

U.S. PATENT DOCUMENTS

2011/0213871 A1 9/2011 DiGirolamo et al.
2012/0296968 A1 11/2012 Lin et al.
(Continued)

FOREIGN PATENT DOCUMENTS

WO 2013/073747 A1 5/2013
WO 2013/074849 A1 5/2013
(Continued)

OTHER PUBLICATIONS

3GPP TSG SA WG2 Meeting #78, "Device triggering and E.164 MSISDN replacement," TD S2-101169, San Francisco, California, USA, pp. 1-4, Feb. 2010.
(Continued)

*Primary Examiner* — Quoc Thai N Vu
(74) *Attorney, Agent, or Firm* — Perkins Coie LLP

(57) ABSTRACT

In a machine to machine (M2M) system, an M2M node is identified by a first machine identification, the first machine identification being specific to an underlying communication network via which the M2M node is communicatively accessible, and a second machine identification, the second machine identification being specific to an M2M application layer by which other M2M application layer entities can communicate with the M2M node. A mapping between the first machine identification and the second machine identification is used for facilitating communication with and triggering of the M2M node.

17 Claims, 6 Drawing Sheets

(51) Int. Cl.
*H04W 60/04* (2009.01)
*H04W 4/70* (2018.01)

(58) Field of Classification Search
CPC ...... H04W 4/70; H04L 61/106; H04L 61/605; H04L 61/6054; H04L 29/12896; H04L 45/00; H04L 61/2007; H04L 67/306
See application file for complete search history.

(56) References Cited

U.S. PATENT DOCUMENTS

| | | | |
|---|---|---|---|
| 2013/0003609 A1* | 1/2013 | Ballot | H04L 67/12 370/259 |
| 2013/0013793 A1 | 1/2013 | Sanchez Herrero | |
| 2013/0016657 A1 | 1/2013 | Muhanna et al. | |
| 2013/0060664 A1 | 3/2013 | Macrae | |
| 2013/0094444 A1 | 4/2013 | Lai et al. | |
| 2013/0103842 A1 | 4/2013 | Seed et al. | |
| 2013/0157673 A1 | 6/2013 | Brusilovsky | |
| 2013/0188515 A1 | 7/2013 | Pinheiro et al. | |
| 2013/0203412 A1 | 8/2013 | Starsinic et al. | |
| 2013/0250968 A1* | 9/2013 | Zhou | H04L 61/2007 370/431 |
| 2013/0332627 A1* | 12/2013 | Skog | H04L 61/106 709/244 |
| 2013/0343538 A1 | 12/2013 | Mizikovsky et al. | |
| 2013/0346504 A1 | 12/2013 | Huang et al. | |
| 2014/0086144 A1 | 3/2014 | Foti et al. | |
| 2015/0264634 A1 | 9/2015 | Ding et al. | |
| 2015/0350904 A1 | 12/2015 | Kim et al. | |
| 2015/0358874 A1 | 12/2015 | Ahn et al. | |
| 2016/0360340 A1 | 12/2016 | Bhalla | |
| 2016/0366716 A1 | 12/2016 | Bhalla | |
| 2017/0026774 A1 | 1/2017 | Koshimizu et al. | |

FOREIGN PATENT DOCUMENTS

| | | |
|---|---|---|
| WO | 2013/171722 A2 | 11/2013 |
| WO | 2013/190402 A1 | 12/2013 |
| WO | 2015/120477 A1 | 8/2015 |
| WO | 2015/120480 A1 | 8/2015 |

OTHER PUBLICATIONS

Bhalla, R., "Discussions on Triggering Aspects in oneM2M," oneM2M Input Contribution, oneM2M Partners, Doc# ARC-2014-0125-Discussion on Triggering Aspects in oneM2M, pp. 1-13, Feb. 2014.
Bhalla, R., "M2M-Node-ID attribute for non-CSE Capable AEs," oneM2M Input Contribution, oneM2M Partners, Doc# ARC-2014-0126-M2M-Node-ID for non-CSE capable Entities, pp. 1-5, Feb. 2014.
Bhalla, R., "pointOfAccess attribute for non-CSE Capable AEs," oneM2M Input Contribution, oneM2M Partners, Doc# ARC-2014-0123-pointOfAccess for AEs on non-CSE capable Entities, pp. 1-5, Feb. 2014.
Bhalla, R., "Some Enhancements for Supporting Device Triggering," oneM2M Input Contribution, oneM2M Partners, Doc# ARC-2014-0127-some enhancements for supporting device triggering, pp. 1-4, Feb. 2014.
Bhalla, R., "Underlying Network Identifier," oneM2M Input Contribution, oneM2M Partners, Doc# ARC-2014-0124-Underlying Network Identifier, pp. 1-3, Feb. 2014.
Bhalla, R., et al., "Application Port ID," oneM2M Input Contribution, oneM2M Partners, Doc# ARC-2014-1179-Application_Port_ID.DOC, pp. 1-8, Feb. 2014.

European Extended Search Report dated Feb. 2, 2017 for European Patent Application No. 15746113.8, filed on Feb. 10, 2015 (8 pages).
European Extended Search Report dated Feb. 2, 2017 for European Patent Application No. 15747056.8, filed on Feb. 10, 2015 (10 pages).
European Extended Search Report dated Feb. 6, 2017 for European Patent Application No. 15747005.5, filed on Feb. 10, 2015 (12 pages).
Foti, G., et al., "Functional architecture in oneM2M-TS-0001 oneM2M Functional Architecture-V-0.0.2," oneM2M Input Contribution, oneM2M Partners, Doc# oneM2M-ARC-2013-0347, pp. 1-3, Jul. 2013.
International Search Report and Written Opinion dated Apr. 28, 2015 for International Application No. PCT/US2015/015287, filed on Feb. 10, 2015 (10 pages).
International Search Report and Written Opinion dated Apr. 28, 2015 for International Application No. PCT/US2015/015274, filed on Feb. 10, 2015 (11 pages).
International Search Report and Written Opinion dated Apr. 28, 2015 for International Application No. PCT/US2015/015280, filed on Feb. 10, 2015 (7 pages).
Jacobs, P., et al., "WI 0002—onem2m Architecture; Technical Specification—M2M Architecture," oneM2M Partners, pp. 1-4, Dec. 2013, Retrieved from the Internet <URL:http://ftp.onem2m.org/meetings/ARC/2013meetings/20131209_ARC8.0_Miyazaki/oneM2M-ARC-2013-0509R04-Revision_of_figure_6-1.DOC> [retrieved on Jan. 26, 2017].
Katusic, D., et al., "Universal Identification Scheme in Machine-to-Machine Systems," IEEE Proceedings of the 12th International Conference on Telecommunications (ConTEL 2013), Zagreb, Croatia, pp. 71-78, Jun. 2013.
Kim, S., et al., "Overall Procedure Discussion related to Security," oneM2M Partners, pp. 1-9, Jan. 2014, Retrieved from the Internet <URL:http://ftp.onem2m.org/meetings/SEC/2014 meetings/20140115_SEC-ah/SEC-2014-0008-Overall_Procedure_Discussion_related_to_Security.PPT> [retrieved on Jan. 26, 2017].
Office Action dated Oct. 10, 2017 for Japanese Patent Application No. 2016-551238, filed on Feb. 10, 2015 (9 pages).
Office Action dated Oct. 17, 2017 for Japanese Patent Application No. 2016-551158, filed on Feb. 10, 2015 (5 pages).
Office Action dated Sep. 26, 2017 for Japanese Patent Application No. 2016-551156, filed on Feb. 10, 2015 (4 pages).
oneM2M Technical Specification, "oneM2M Functional Architecture Baseline Draft," oneM2M Partners, Doc# oneM2M-TS-0001-V-2014-08, pp. 1-297, Aug. 2014, <URL:http://www.onem2m.org/images/files/deliverables/TS-0001-oneM2M-Functional-Architecture-V-2014-08.pdf>.
oneM2M Technical Specification, "oneM2M Functional Architecture," oneM2M Partners, Doc# oneM2M-TS-0001-V-0.3.2, pp. 1-171, Jan. 2014, <URL:http://ftp.onem2m.org/Meetings/ARC/2014%20meetings/20140109_ARC8.1/ARC-2014-0618R02-Functional_Architecture_Spec_TS-0001_v0_3_2_Draft-Baseline.ZIP>.
oneM2M Technical Specification, "oneM2M Functional Architecture," oneM2M Partners, Doc# oneM2M-TS-0001-V-0.4.0, pp. 1-169, Feb. 2014, <URL:http://member.onem2m.org/Application/documentapp/downloadimmediate/default.aspx?docID=4723>.
Yu, J., "How to Name Your M2M Device," Neustar Blog, pp. 1-5, Feb. 2012, Retrieved from the Internet <URL: https://www.neustar.biz/blog/how-to-name-your-m2m-device> [retrieved on Jan. 26, 2017].
"Machine-to-Machine communications (M2M); Functional architecture," ETSI TS 102 690 v2.1.1, Technical Specification, 332 pages, Oct. 2013.

\* cited by examiner

TECHNIQUES FOR MAPPING MACHINE TO MACHINE COMMUNICATION TO DIFFERENT UNDERLYING NETWORKS

CROSS REFERENCE TO RELATED APPLICATIONS

This patent document claims the benefit of U.S. Provisional Patent Application No. 61/938,127, filed on Feb. 10, 2014. The entire content of the before-mentioned patent application is incorporated by reference as part of the disclosure of this document.

BACKGROUND

This document relates to machine-to-machine (M2M) communication.

M2M communication generally refers to communication between two different devices, which is not explicitly triggered by a user. Devices may perform M2M communication using wired or wireless connectivity. The communication is typically initiated by an application residing on one of the machine to gather or send information to a counterpart application on the other machine.

SUMMARY

This document describes technologies, among other things, for facilitating communication between M2M devices. Using the disclosed techniques, in some embodiments, application level connectivity can be established between M2M nodes, regardless of their capabilities and which underlying networks the nodes are accessible from.

In one aspect, methods, systems and apparatus for facilitating M2M communications include providing a first machine identification to an M2M node, the first machine identification being specific to an underlying communication network via which the M2M node is communicatively accessible, and a second machine identification to the M2M node, the second machine identification being specific to an M2M application layer by which other M2M application layer entities can communicate with the M2M node; and storing a mapping between the first machine identification and the second machine identification.

These and other aspects, and their implementations and variations are set forth in the drawings, the description and the claims.

BRIEF DESCRIPTION OF THE DRAWINGS

Like reference symbols in the various drawings indicate like elements.

DETAILED DESCRIPTION

Figure 1:
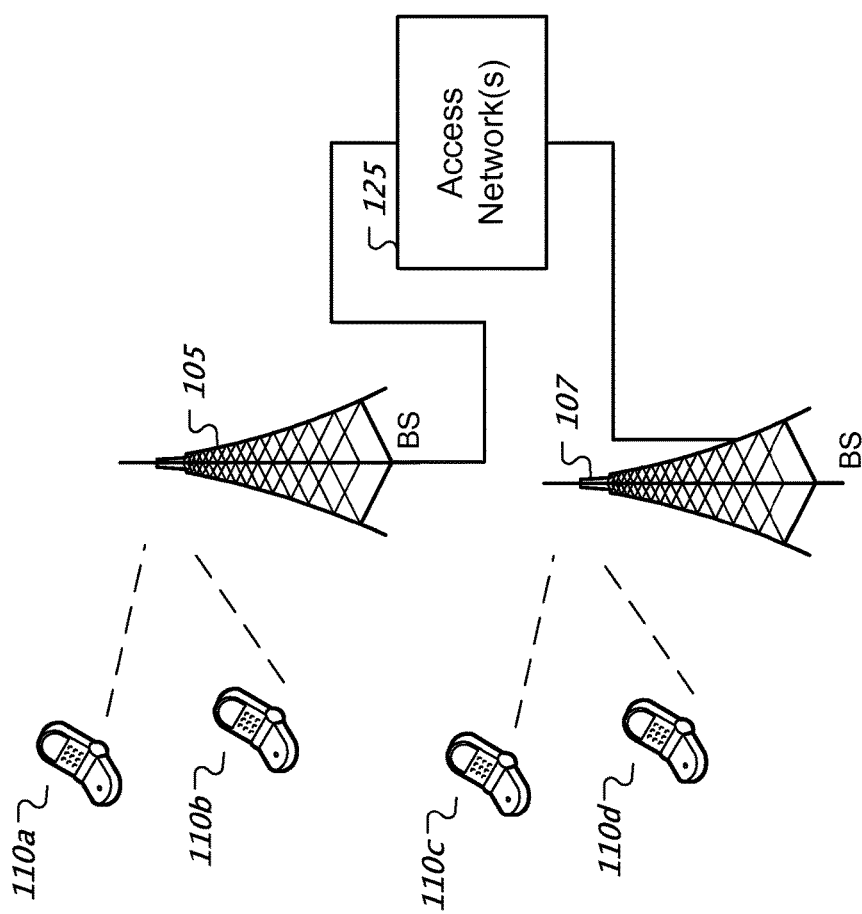
FIG. 1 depicts example wireless network architecture.

The following abbreviations are used in this document.
ADN: Application Dedicated Node.
ADN-AE: AE which resides in the Application Dedicated Node.
AE: Application Entity.
App: Application.
ASN: Application Service Node.
ASE-AE: Application Entity that is registered with the CSE in the Application Service Node.
ASN-CSE: CSE which resides in the Application Service Node.
BBF: Broadband Forum.
CSE: Common Service Entity.
CSF: Common Service Function.
EF: Enabler Function.
IEEE: Institute of Electrical and Electronics Engineers
IETF: Internet Engineering Task Force
IN: Infrastructure Node.
IN-AE: Application Entity that is registered with the CSE in the Infrastructure Node.
IN-CSE: CSE which resides in the Infrastructure Node.
JNI: Java Native Interface.
LTE: Long Term Evolution.
MAC: Medium Access Control.
M2M: Machine to machine.
MN: Middle Node.
MN-CSE: CSE which resides in the Middle Node.
NSE: Network Service Entity.
SDO: Standards development organization.
SP: Service Provider.
UNet: Underlying network (in which an M2M device resides).

In M2M communications, the two endpoints between which communication occurs often are in different networks. In a typical application scenario, one endpoint may be a sensor or a utility box that may go offline for extended time periods and another endpoint may be an application server such as a utility billing server or an M2M server that may be deployed in a managed network. Data packets traveling back and forth between these two end points may be routable via various routing options. For example, one endpoint may have connectivity over a licensed spectrum (e.g., Long Term Evolution) or an unlicensed spectrum (e.g., Wi-Fi). When one endpoint is offline for extended time periods, e.g., days or weeks, the way in which packets were routed to that end point during a last communication session may not necessarily the way in which the packets can be routed in a current communication session. Furthermore, various routing options may incur various costs (e.g., bandwidth charges or power dissipation during transmission).

In a machine to machine communication system such as the oneM2M system, device triggering is a mechanism that a CSE that resides in the Infrastructure Node (IN-CSE) can invoke from an underlying network to request nodes in the Field Domain (e.g., ASN, MN) to perform certain tasks. Such device triggering mechanism consists of the IN-CSE interacting with an entity called an Interworking-IWF that is provided in the underlying network.

For example, when IN-CSE cannot reach the ASN/MN in the Field Domain, possibly due to stale "pointOfAccess" (stale IP address etc.), the IN-CSE may request the Interworking-IWF to reach such ASN/MN via underlying network specific mechanisms. For this purpose, IN-CSE needs to provide an identifier of the ASN/MN that is understood by the underlying network. For example, the identifiers used for identifying nodes in oneM2M include CSE-ID, and M2M-Node-ID. But such oneM2M specific identifiers are not understood by equipment in the underlying networks. Therefore, oneM2M supports a mechanism for the mapping of oneM2M specific identifier (e.g., CSE-ID) to an M2M-Ext-ID (M2M External Identifier). Such mapping of CSE-ID to M2M-Ext-ID is underlying network specific. Stated differently, the CSE-ID of an ASN maps to a certain M2M-Ext-ID for a 3GPP underlying network, and that may be different from the mapped M2M-Ext-ID for a wireless-LAN underlying network.

Another factor to consider is that oneM2M supports two types of nodes in the Field Domain. One type of nodes provides CSE capability, whereas the other type of nodes to not support CSE. The first type of nodes may be termed as CSE-capable nodes. ASN and MN are examples of such CSE-capable nodes. The other type of nodes may be termed as non-CSE-capable nodes, such as ADNs. ASNs and MNs have CSE-IDs available, whereas ADNs can be addressed via their M2M-Node-ID only.

oneM2M provides for the mapping of CSE-IDs to underlying network specific M2M-Ext-IDs. No mapping of M2M-Node-ID to M2M-Ext-ID is specified in oneM2M.

Service Layer specifications developed by organizations such as oneM2M, ETSI TC M2M, TIA TR-50 etc. (M2M SDOs) need to support efficient deployment of M2M Solutions by a wide range of market-focused (vertical) organizations. With the focus on the Service Layer, such organizations have been taking transport network-independent view of the end-to-end services. Yet, they need to make sure that their Service Layer specifications can be used effectively for interfacing with different types of transport networks. Such transport networks include but are not limited to the wireless and wireline networks being defined by 3GPP, 3GPP2, IEEE, IETF and BBF.

oneM2M provides for the mapping of CSE-IDs to underlying network specific M2M-Ext-IDs. However, such mapping fails to alleviate the above-discussed operational problems. The present document provides, among other techniques, ways in which a mapping of M2M-Node-ID to M2M-Ext-ID can be accomplished and used for M2M communication.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
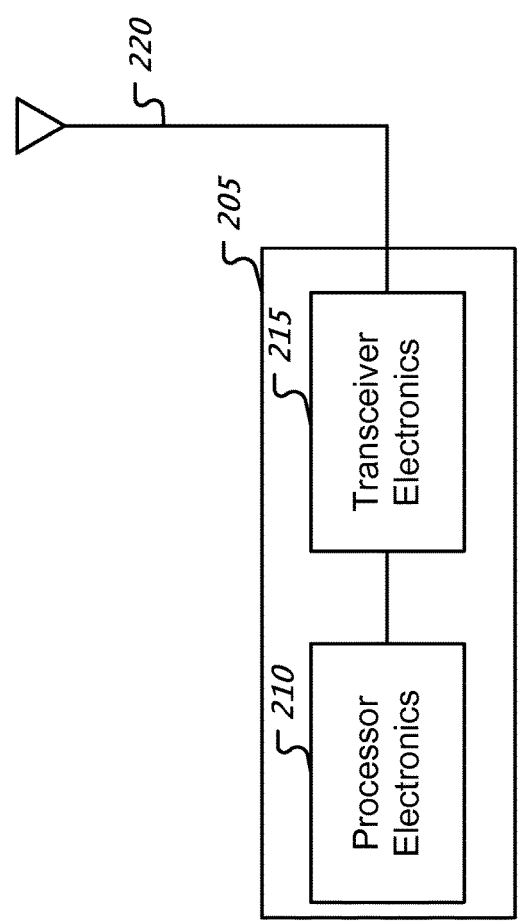
FIG. 2 is a block diagram of a radio device operable in a wireless network.

FIG. 2 shows an example of a radio transceiver station for implementing a wireless device, a base station or other wireless communication modules. Various examples of radio stations include base stations and wireless devices in FIG. 1. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA or GSM based air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA2000 1x, HRPD, WiMAX, GSM, LTE, and Universal Mobile Telecommunications System (UMTS).

In some implementations, a radio station 205 may additionally be configured with a local area network connectivity such as a 802.11 (a/b/g/n) interface. The availability of such an interface may make it possible to communicatively couple the radio station 205 to the Internet via the local area connection. For example, a user may access services over her user equipment (UE) by connecting to the service via a wireless local area network connection (e.g., home Wi-Fi access) through a fixed broadband network such as a cable modem network or a DSL network. The above described radio station 205 may be used to implement techniques disclosed in the present document.

Example M2M Systems

Figure 3:
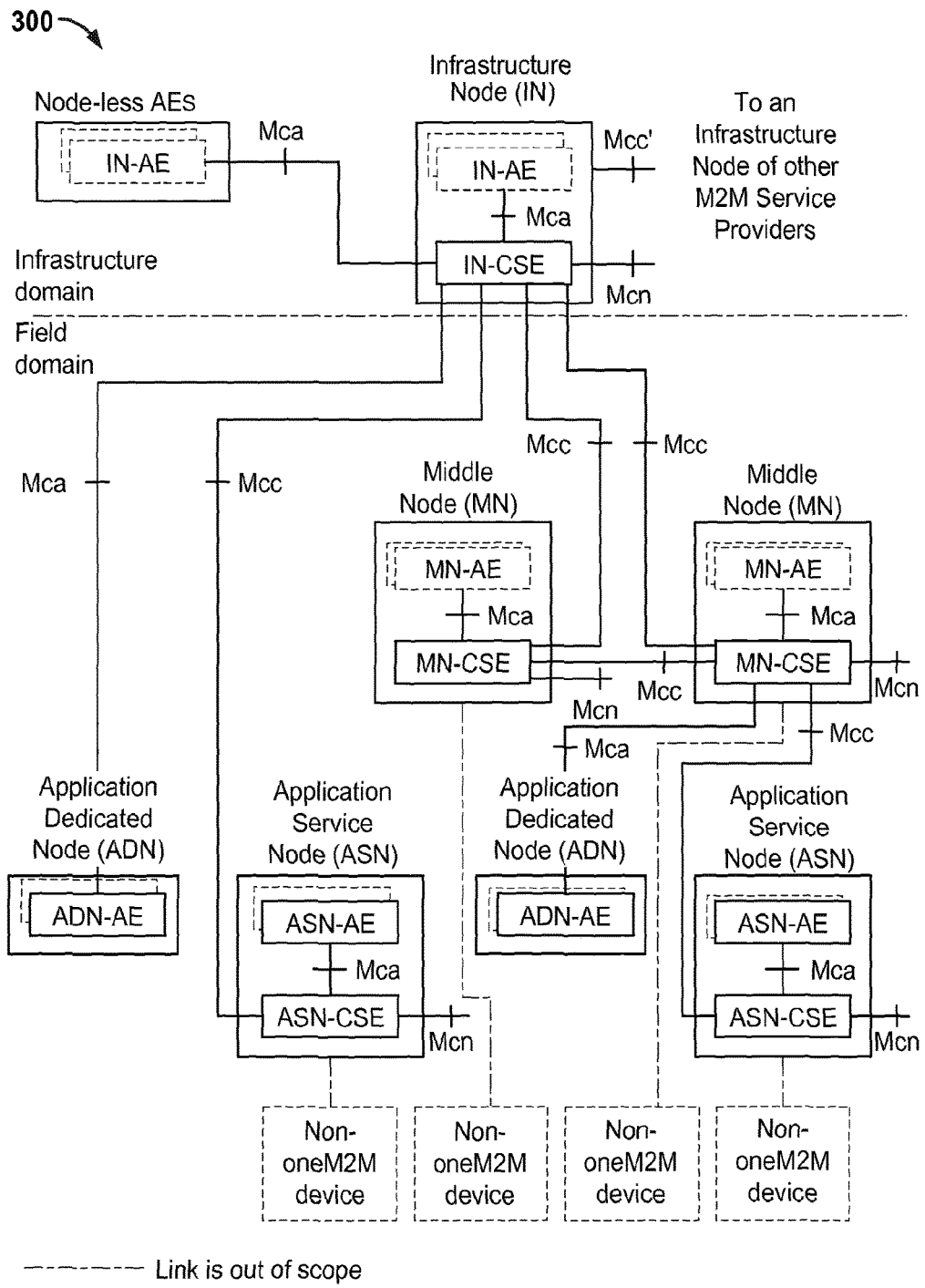
FIG. 3 shows an example of an M2M communication system.

FIG. 3 illustrates example configurations 300 of an M2M communication system 300, e.g., as described by oneM2M documents. In FIG. 3, the following abbreviations are used:

Node-less AEs: This entity indicates that IN-AEs maybe hosted by an Application Service Provider.

Node: A functional entity that contains at least one Common Services Entity (CSE) and/or one Application Entity (AE). A node may be contained in a physical apparatus, e.g., an M2M device, a Gateway or a Server Infrastructure. In general, CSEs resident in different nodes are not identical and are dependent on the services supported by the CSE in that node. In some embodiments, two types of nodes are defined. One type of node is a functional entity that contains at least one Common Services Entity and/or one or more oneM2M Application Entities. Such nodes may be referred to as CSE-capable nodes. The other type of node is a functional entity that shall contain one or more Application Entities, and no Common Service Entity. Such nodes may be referred to as non-CSE-capable nodes. In a oneM2M architecture, a CSE-capable oneM2M node may be contained in a physical object e.g., M2M Device, Gateway or Server Infrastructure. Non-CSE-capable oneM2M node may be contained in physical objects such as sensors, actuators etc. CSE-capable and non-CSE capable nodes communicate over Mca reference Point The Mcc' reference point aims to be as similar as possible to the Mcc reference point. But due to the nature of inter-M2M Service Provider communications, some differences may exist.

Many different types of nodes may exist in the configuration 300. A node is not necessarily mapped to a single actual physical object, although it may be mapped to actual physical objects. The nodes may include:

Application Service Node (ASN): An Application Service Node is a node that contains one Common Services Entity and contains at least one Application Entity. An Application Service Node may communicate over a Mcc reference point with either: exactly one Middle Node; or exactly one Infrastructure Node. Example of physical mapping includes an Application Service Node could reside in an M2M Device.

Application Dedicated Node (ADN): An Application Dedicated Node may contain at least one Application Entity and does not contain a Common Services Entity. An Application Dedicated Node communicates with a Middle Node or an Infrastructure Node over an Mca reference point. Examples of physical mapping include an Application Dedicated Node that could reside in a constrained M2M Device.

Middle Node (MN): A Middle Node is a node that contains one Common Services Entity and contains zero or more Application Entities. A Middle Node communicates with either an IN or another MN over Mcc, plus at least an IN/MN/ASN over Mcc, or an ADN over Mca. Examples of physical mapping may include a Middle Node that could reside in an M2M Gateway.

Infrastructure Node (IN): An Infrastructure Node is a node that contains one Common Services Entity and contains zero or more Application Entities. An Infrastructure Node communicates over respective Mcc reference points with one or more Middle Node(s); and/or one or more Application Service Node(s). In addition, an Infrastructure Node communicates with one or more Application Dedicated Nodes over respective Mca reference points. Example of physical mapping: an Infrastructure Node could reside in an M2M Server Infrastructure.

In one example configuration, IN-CSE can trigger MN-CSEs and ASN-CSEs, by providing a mapping between their CSE-IDS to their respective M2M-Ext-IDs, to the device trigger function.

Whereas if IN-CSE wants to trigger an ADN-AE, IN-CSE has no corresponding mapped M2M-Ext-ID for the ADN that hosts ADN-AE. This is due to the fact that ADN is a non-CSE-capable node, hence it does not have a corresponding CSE-ID. ADN, however, has M2M-Node-ID assigned to it. In order to be able to map M2M-Node-ID of the ADN to an M2M-Ext-ID, such mapping information should be supported at the IN-CSE.

The other issue for being able to trigger such ADNs relates to the scenario that when ADN-AEs register with IN-CSE, M2M-Node-ID of the ADN is not made available to the IN-CSE. Registration of an ADN-AE with IN-CSE results in the creation of a corresponding <application> resource at IN-CSE. In order to be able to trigger an ADN-AE, the M2M-Node-ID of the ADN that hosts ADN-AE needs to be added as an additional attribute at the IN-CSE within the <application> resource structure.

In some embodiments, a mapping of M2M-Node-ID to an M2M-Ext-ID at the IN may be performed. Such mapping may be used by ADNs to support device triggering.

In some embodiments, an M2M-Node-ID of the ADN that hosts the ADN-AEs that are capable of being triggered, is made available at the IN-CSE at the time of ADN-AE registration.

This document provides examples of how "M2M-Node-ID" can be provisioned in the <application> resource structure, e.g., as being defined by oneM2M and how mapping of M2M-Node-ID to M2M-Ext-ID can be performed. Such M2M-Node-ID attribute can be used for ADN-AEs that then become capable of being triggered by IN-CSE. Such ADN-AEs will typically be registered with IN-CSE directly.

Resource Type: Application

Figure 4:
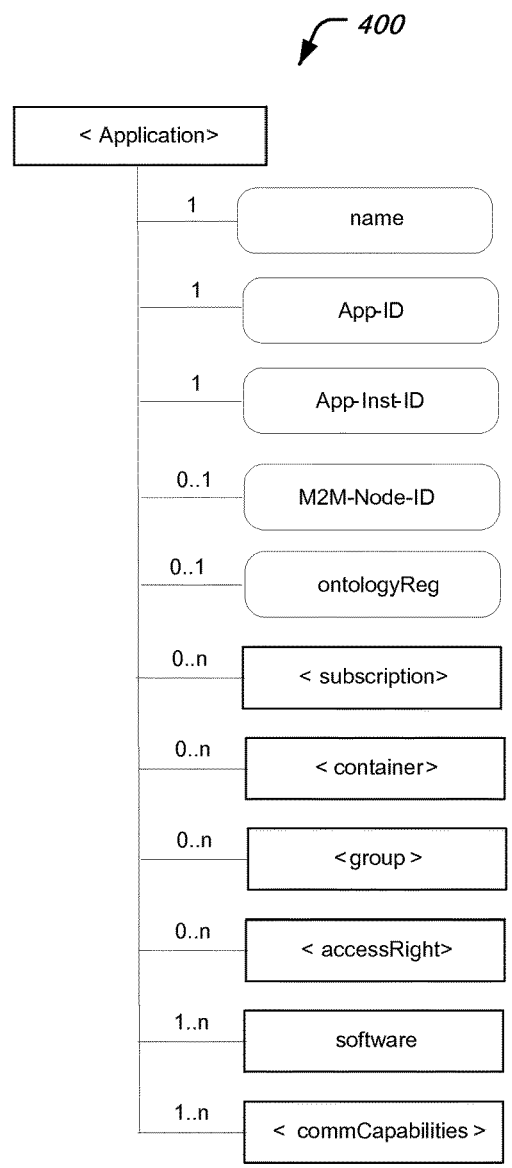
FIG. 4 depicts an example listing 400 of an <application> resource.

FIG. 4 depicts an example listing 400 of an <application> resource. The <application> resource represents information about an AE known to a given CSE.

This resource contains the child resources according to their multiplicity in Table 1, where the entry 0 indicates the optionally of the child resource. As can be seen from Table 1, child resources can be specified by name and by communication capabilities. The application name represents a software component (or components for multiplicity greater than 1), that composes the application. A version number, name and the state of the application may also be specified. The <commCapabilities> resource type may describe communication capabilities (e.g., protocol) that can be used by the corresponding AE.

TABLE 1

| Child Resource Name of <Application> | Child Resource Type | Multiplicity | Description |
|---|---|---|---|
| [variable] | <subscription> | 0 . . . n | |
| [variable] | <container> | 0 . . . n | |
| [variable] | <group> | 0 . . . n | |
| [variable] | <accessRight> | 0 . . . n | |
| software__[i] | <mgmtObj> | 1 . . . n | This resource represents the software component (or components, if the multiplicity is greater than 1) that compose the application. This mgmtObj will have at least the following <parameters> child resources of its "parameters" subresource: name (multiplicity 1) version (multiplicity 1) state (multiplicity 1) |
| [variable] | <commCapabilities> | 1 . . . n | This resource describes the communication capabilities (essentially the protocols) supported and used by the corresponding Application Entity over the Mca reference point to this CSE. |

The <Application> resource can contain the attributes listed in Table 2. Among the attributes are an attribute that may have a human readable name, and other attributes as listed in Table 2.

TABLE 2

| Attribute Name of <Application> | Multiplicity | RW/ RO/ WO | Description |
|---|---|---|---|
| resourceType | 1 | RO | |
| parentID | 1 | RO | |
| expirationTime | 0 . . . 1 | RW | |
| accessRightID | 1 | RW | |
| creationTime | 1 | RW | |
| lastModifiedTime | 1 | RO | |
| labels | 0 . . . 1 | RO | |
| name | 1 | RO | The (usually human readable) name of the application, as declared by the application developer (e.g., "HeatingMonitoring") |
| App-ID | 1 | RO | Application Identifier |
| App-Inst-ID | 1 | RO | When the application resource refers to an actual application instance in the executing environment. |
| M2M-Node-ID | 0 . . . 1 | RO | Applicable for ADN-AEs that register with IN-CSE, and those that need to be triggerable by IN-CSE. Globally unique ID of the ADN hosting such AE. |
| ontologyRef | 0 . . . 1 | RW | A reference (URI) of the ontology used to represent the information that is managed and understood by the application; to be passed to the application |

Furthermore, in M2M communication, AEs on nodes such as ADNs should be able to support device triggering. To be able to achieve this, in some embodiments, the construct M2M-Ext-ID could be used such that M2M-Node-ID can also be mapped to M2M-Ext-ID.

M2M External Identifier (M2M-Ext-ID) targeted to a CSE-capable node (e.g., ASN, MN), identified by a CSE-ID; or targeted to a non-CSE capable node (e.g., ADN), identified by M2M-Node-ID are requested from the underlying network. The M2M External Identifier allows the underlying network to identify the M2M Device associated with the CSE-ID or with the M2M-Node-ID, as appropriate, for the service request. To that effect, the underlying network maps the M2M-Ext-ID to the Underlying Network Identifier it allocated to the target M2M Device. In addition, the M2M SP can maintain the association between the CSE-ID/M2M-Node-ID, the M2M-Ext-ID and the identity of the underlying network. Both pre-provisioned and dynamic plug and play association between the CSE-ID/M2M-Node-ID with the M2M-Ext-ID could to be supported.

In some embodiments, there is a 1:1:1 mapping between M2M-Ext-ID, the identity of the underlying network and the CSE-ID/M2M-Node-ID. Hence, an M2M SP interworking with multiple underlying networks will have a different M2M-Ext-IDs associated with the same CSE-ID/M2M-Node-ID, one per underlying network and would have to select the appropriate M2M-Ext-ID for any service request it initiates towards an underlying network. The mapping by the underlying network of the M2M-Ext-ID to the M2M Device may be access network specific.

Figure 5:
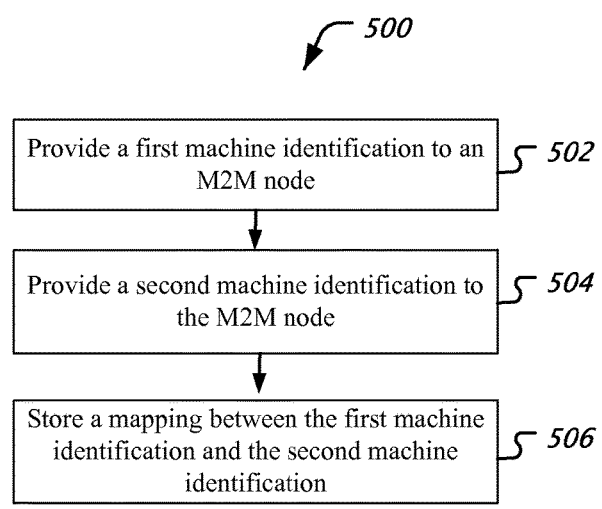
FIG. 5 shows an example of a flowchart for a method of facilitating M2M communication.

FIG. 5 shows an example flowchart for a method 500 of facilitating M2M communication between an AE and an M2M node.

The method 500 includes, at 502, providing a first machine identification to an M2M node, the first machine identification being specific to an underlying communication network via which the M2M node is communicatively accessible.

The method 500 includes, at 504, acquiring a second machine identification to the M2M node, the second machine identification being specific to an M2M application layer by which other M2M application layer entities can communicate with the M2M node. The second machine identification may be from an identification given to the M2M node by an M2M service layer, e.g., the M2M-Node-ID or CSI-ID, as described in this document. This identification may thus be independent of the underlying network in which the M2M node resides.

The method 500 includes, at 506, includes storing a mapping between the first machine identification and the second machine identification.

In some embodiments, the acquiring operation may be performed by receiving a registration message and acquiring the second machine identification based on the registration message. In some embodiments, the method 500 further includes triggering the M2M node based on the mapping.

Figure 6:
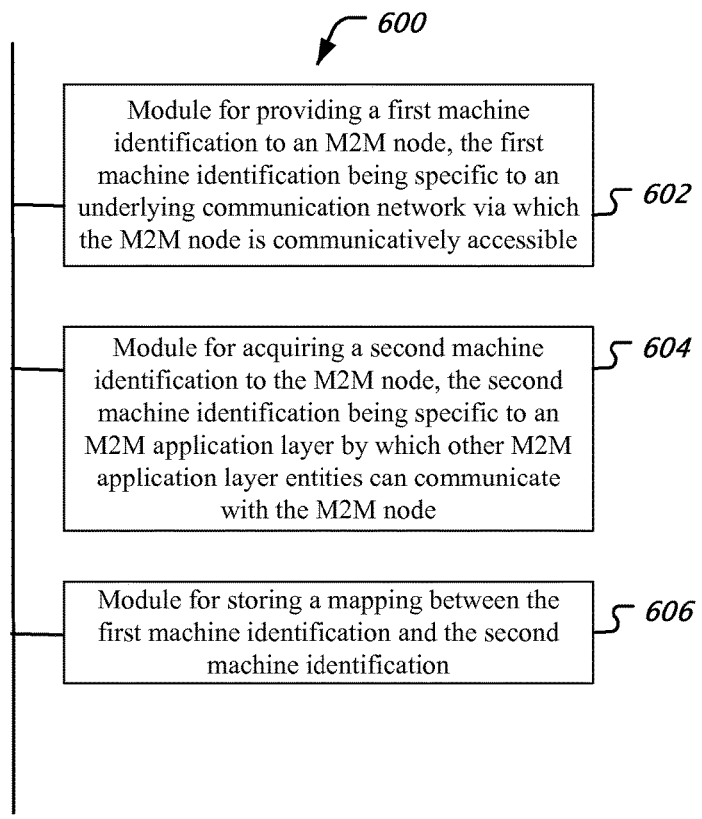
FIG. 6 shows an example of a block diagram for an apparatus for facilitating M2M communication.

FIG. 6 shows an example apparatus 600 for facilitating M2M communication between an M2M node and an AE. The apparatus 600 includes a module 602 that provides a first machine identification to an M2M node, the first machine identification being specific to an underlying communication network via which the M2M node is communicatively accessible, a module 604 that acquires a second machine identification to the M2M node, the second machine identification being specific to an M2M application layer by which other M2M application layer entities can communicate with the M2M node, and a module 606 that stores a mapping between the first machine identification and the second machine identification. Using the mapping, an M2M device can be accessed (e.g., for triggering or for communication) regardless of whether or not the device hosts a common service entity function and regardless of the detail of which underlying network the device is currently available on.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for facilitating Machine-to-Machine (M2M) communication, the method comprising:
   providing a first machine identification to an M2M node, the first machine identification being specific to an underlying communication network via which the M2M node is communicatively accessible;
   acquiring a second machine identification given to the M2M node, the second machine identification being specific to an M2M application layer by which other M2M application layer entities can communicate with the M2M node, wherein
   the second machine identification is added as an additional attribute to an application resource structure of the M2M node,
   the application resource structure is included at a Common Services Entity of an Infrastructure Node, and the application resource structure represents information about the M2M application layer known to the Common Service Entity of the Infrastructure Node;
   storing a mapping between the first machine identification and the second machine identification; and
   triggering the M2M node using the mapping.

2. The method of claim 1, wherein the acquiring includes receiving a registration message and acquiring the second machine identification based on the registration message.

3. The method of claim 1, further including:
   acquiring a third machine identification to the M2M node, the third machine identification being specific to common M2M services hosted by the M2M node; and
   storing another mapping between the first machine identification and the third machine identification.

4. The method of claim 1, wherein the second machine identification is a globally unique identifier for the M2M application layer registered with the Infrastructure Node.

5. An apparatus for facilitating Machine-to-Machine (M2M) communication, the apparatus comprising:
  a hardware-implemented module that provides a first machine identification to an M2M node, the first machine identification being specific to an underlying communication network via which the M2M node is communicatively accessible;
  a hardware-implemented module that acquires a second machine identification given to the M2M node, the second machine identification being specific to an M2M application layer by which other M2M application layer entities can communicate with the M2M node, wherein
  the second machine identification is added as an additional attribute to an application resource structure of the M2M node,
  the application resource structure is included at a Common Services Entity of an Infrastructure Node, and the application resource structure represents information about the M2M application layer known to the Common Service Entity of the Infrastructure Node;
  a hardware-implemented module that stores a mapping between the first machine identification and the second machine identification; and
  a hardware-implemented module that triggers the M2M node based on the mapping.

6. The apparatus of claim 5, wherein the hardware-implemented module that acquires includes a hardware-implemented module that receives a registration message and acquires the second machine identification based on the registration message.

7. The apparatus of claim 5, further including:
  a hardware-implemented module that acquires a third machine identification to the M2M node, the third machine identification being specific to common M2M services hosted by the M2M node; and
  a hardware-implemented module that stores another mapping between the first machine identification and the third machine identification.

8. A computer program product comprising a non-transitory tangible computer readable storage medium having code stored thereon, the code, when executed by a processor, causing the processor to implement a method for facilitating machine to machine communication between an application entity and a machine to machine communication node, the method comprising:
  providing a first machine identification to an M2M node, the first machine identification being specific to an underlying communication network via which the M2M node is communicatively accessible;
  acquiring a second machine identification given to the M2M node, the second machine identification being specific to an M2M application layer by which other M2M application layer entities can communicate with the M2M node;
  adding the second machine identification as an additional attribute to an application resource structure of the M2M node, wherein the application resource structure is included at a Common Services Entity of an Infrastructure Node, and the application resource structure represents information about the M2M application layer known to the Common Service Entity of the Infrastructure Node;
  storing a mapping between the first machine identification and the second machine identification; and
  triggering the M2M node using the mapping.

9. The computer program product of claim 8, wherein the second machine identification is a globally unique identifier for the M2M application layer registered with the Infrastructure Node.

10. The computer program product of claim 8, wherein the acquiring includes receiving a registration message and acquiring the second machine identification based on the registration message.

11. The computer program product of claim 8, wherein the method further includes:
  acquiring a third machine identification to the M2M node, the third machine identification being specific to common M2M services hosted by the M2M node; and
  storing another mapping between the first machine identification and the third machine identification.

12. A machine to machine communication system-comprising
  an M2M node;
  a module implemented in hardware that provides a first machine identification to the M2M node, the first machine identification being specific to an underlying communication network via which the M2M node is communicatively accessible;
  a module implemented in hardware that acquires a second machine identification given to the M2M node, the second machine identification being specific to an M2M application layer by which other M2M application layer entities can communicate with the M2M node, wherein
  the second machine identification is added as an additional attribute to an application resource structure of the M2M node, the application resource structure is included at a Common Services Entity of an Infrastructure Node, and the application resource structure represents information about the M2M application layer known to the Common Service Entity of the Infrastructure Node;
  a module implemented in hardware that stores a mapping between the first machine identification and the second machine identification; and
  a module implemented in hardware that triggers the M2M node based on the mapping.

13. The machine to machine communication system of claim 12, wherein the module that acquires includes a module implemented in hardware that receives a registration message and acquires the second machine identification based on the registration message.

14. The machine to machine communication system of claim 12, further including:
  a module implemented in hardware that acquires a third machine identification to the M2M node, the third machine identification being specific to common M2M services hosted by the M2M node; and
  a module implemented in hardware that stores another mapping between the first machine identification and the third machine identification.

15. An apparatus for facilitating Machine-to-Machine (M2M) communication, the apparatus comprising a processor configured to:
  provide a first machine identification to an M2M node, the first machine identification being specific to an underlying communication network via which the M2M node is communicatively accessible;
  acquire a second machine identification given to the M2M node, the second machine identification being specific to an M2M application layer by which other M2M application layer entities can communicate with the M2M node, wherein the second machine identification is added as an additional attribute to an application resource structure of the M2M node, the application resource structure is included at a Common Services Entity of an Infrastructure Node, and the application resource structure represents information about the M2M application layer known to the Common Service Entity of the Infrastructure Node;

store a mapping between the first machine identification and the second machine identification; and trigger the M2M node based on the mapping.

16. The apparatus of claim 15, wherein the second machine identification is acquired based on a received registration message.

17. The apparatus of claim 15, wherein the processor is further configured to:

acquire a third machine identification to the M2M node, the third machine identification being specific to common M2M services hosted by the M2M node; and store another mapping between the first machine identification and the third machine identification.

* * * * *